US012595762B2

(12) United States Patent
Muldoon et al.

(10) Patent No.: US 12,595,762 B2
(45) Date of Patent: Apr. 7, 2026

(54) GAS TURBINE ENGINE WITH BLEED DIFFUSER BAFFLES

(71) Applicant: Raytheon Technologies Corporation, Farmington, CT (US)

(72) Inventors: Marc J. Muldoon, Marlborough, CT (US); William K. Ackermann, East Hartford, CT (US); Anthony R. Bifulco, Ellington, CT (US)

(73) Assignee: RTX Corporation, Farmington, CT (US)

( * ) Notice: Subject to any disclaimer, the term of this patent is extended or adjusted under 35 U.S.C. 154(b) by 263 days.

(21) Appl. No.: 18/171,092

(22) Filed: Feb. 17, 2023

(65) Prior Publication Data

US 2024/0280050 A1 Aug. 22, 2024

(51) Int. Cl.
F02C 6/08 (2006.01)
F01D 9/02 (2006.01)

(52) U.S. Cl.
CPC .................. F02C 6/08 (2013.01); F01D 9/02 (2013.01); *F05D 2220/323* (2013.01); *F05D 2240/126* (2013.01); *F05D 2260/60* (2013.01)

(58) Field of Classification Search
CPC .................. F02C 6/08; F02C 9/18; F02C 9/52
See application file for complete search history.

(56) References Cited

U.S. PATENT DOCUMENTS

| | | | |
|---|---|---|---|
| 5,160,241 A | 11/1992 | Glynn | |
| 5,351,478 A * | 10/1994 | Walker .................. | F04D 29/522 |
| | | | 60/785 |
| 5,632,141 A * | 5/1997 | Sloop ........................ | F02C 6/08 |
| | | | 60/785 |
| 6,782,702 B2 | 8/2004 | Charon et al. | |

(Continued)

FOREIGN PATENT DOCUMENTS

| | | |
|---|---|---|
| CN | 113062800 A | 7/2021 |
| DE | 102019110834 A1 | 10/2020 |

(Continued)

OTHER PUBLICATIONS

European Search Report for EP Application No. 24158183.4 dated Jun. 19, 2024.

*Primary Examiner* — Phutthiwat Wongwian
*Assistant Examiner* — Jacek Lisowski
(74) *Attorney, Agent, or Firm* — Carlson, Gaskey & Olds, P.C.

(57) ABSTRACT

A gas turbine engine includes a compressor section having a downstream most location and more upstream locations. A compressor housing surrounds the compressor rotors. A combustor is downstream of the compressor and a turbine section is downstream of the combustor. At least one bleed inlet passage bleeds air compressed from the compressor section, and delivers the air for use on an associated aircraft. A baffle plate is intermediate the at least one bleed inlet passage and a bleed exit port from the gas turbine engine. The baffle plate has a plurality of holes for allowing the air (Continued)

to flow from the bleed inlet passage to the bleed exit port, with an area of the holes increasing from a location adjacent the at least one bleed inlet passage and in a circumferential direction away from the at least one bleed inlet passage. An aircraft air supply system and an aircraft are also disclosed.

20 Claims, 5 Drawing Sheets

(56)                    References Cited

U.S. PATENT DOCUMENTS

| | | | |
|---|---|---|---|
| 7,374,396 | B2 | 5/2008 | Martin et al. |
| 9,797,314 | B2 * | 10/2017 | Hillel .................. F04D 27/0261 |
| 10,513,984 | B2 * | 12/2019 | Kim .......................... F02C 3/14 |
| 11,230,936 | B2 * | 1/2022 | Lemaire .................. F01D 9/041 |
| 2009/0000307 | A1 | 1/2009 | Tatebayashi |
| 2022/0282627 | A1 | 9/2022 | Wickersham et al. |

FOREIGN PATENT DOCUMENTS

| | | |
|---|---|---|
| EP | 2492199 A2 | 8/2012 |
| WO | 2014/098936 A1 | 6/2014 |

* cited by examiner

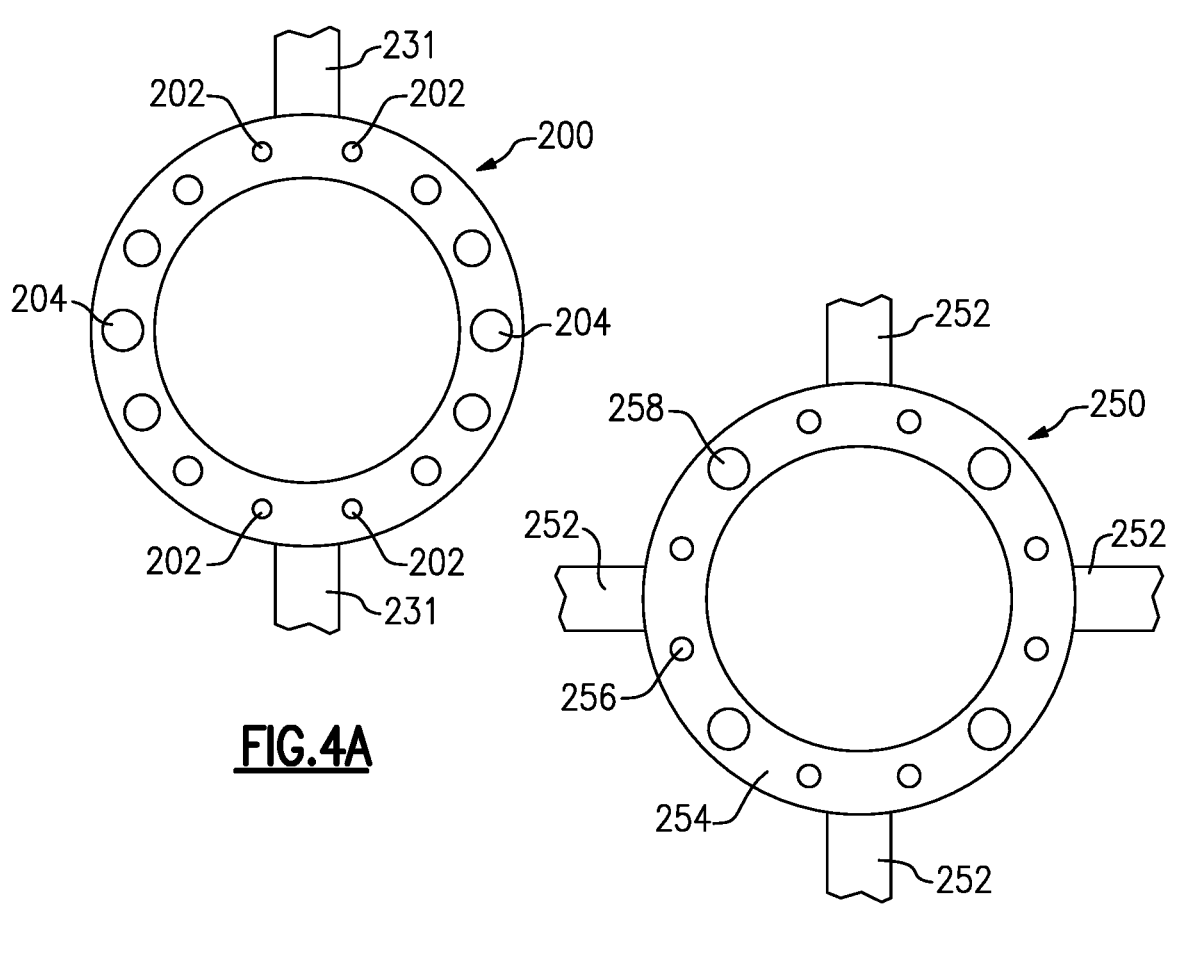
FIG.4A
FIG.4B
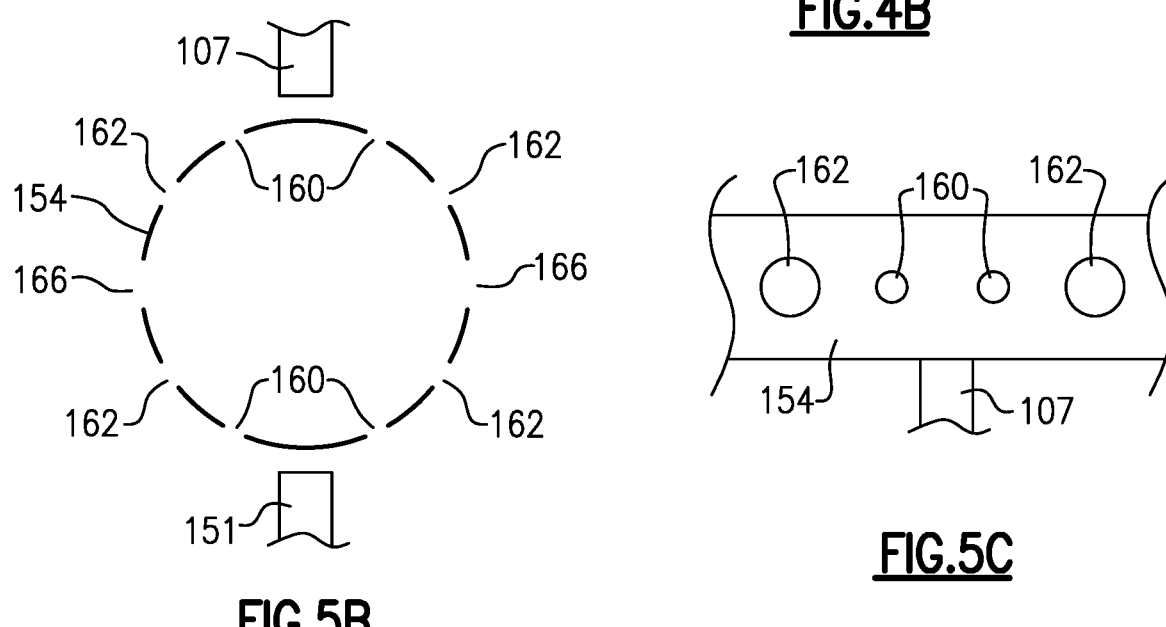
FIG.5B
FIG.5C

GAS TURBINE ENGINE WITH BLEED DIFFUSER BAFFLES

BACKGROUND OF THE INVENTION

This application relates to baffles to improve the bleeding of compressor air from a gas turbine engine.

Gas turbine engines are known, and typically include a fan delivering air into a bypass duct as propulsion air. Air is also delivered into a compressor. The compressed air is delivered into a combustor where it is mixed with fuel and ignited. Products of this combustion pass downstream over turbine rotors driving them to rotate. The turbine rotors in turn drive the compressor and fan rotors.

It is known to bleed compressed air from the compressor section for various uses on an associated aircraft. As one example, a bleed system is utilized that bleeds air from a lower pressure location in the compressor section and also from a higher pressure location. Controls and valving select which of these air supplies is sent to an aircraft cabin air conditioning system.

At low power operation of the engine the air is bled from the higher-pressure section, and at higher power operation the air is bled from a lower pressure section of the compressor. Examples of the higher power operation include takeoff whereas as the lower power operation include at ground idle. This selective use is done to avoid using air that is over-pressurized and at excessively high temperature for the end use.

Typically, a plurality of bleed ports are packaged into each of these locations (e.g., higher-pressure section, lower pressure section). Further, there are challenges in maintaining adequate engine stability margins while operating these bleed systems.

SUMMARY OF THE INVENTION

In a featured embodiment, a gas turbine engine includes a compressor section having a downstream most location and more upstream locations. A compressor housing surrounds the compressor rotors. A combustor is downstream of the compressor and a turbine section is downstream of the combustor. At least one bleed inlet passage bleeds air compressed from the compressor section, and delivers the air for use on an associated aircraft. A baffle plate is intermediate the at least one bleed inlet passage and a bleed exit port from the gas turbine engine. The baffle plate has a plurality of holes for allowing the air to flow from the bleed inlet passage to the bleed exit port, with an area of the holes increasing from a location adjacent the at least one bleed inlet passage and in a circumferential direction away from the at least one bleed inlet passage.

In another embodiment according to the previous embodiment, there are at least two bleed inlet passages, associated baffle plates and bleed exit ports with one of the bleed inlet passages associated with a higher pressure location and one of the bleed inlet passages associated with a lower pressure location in the compressor section.

In another embodiment according to any of the previous embodiments, the bleed inlet passage associated with the lower pressure location extends through a housing of the compressor section.

In another embodiment according to any of the previous embodiments, the higher pressure location is downstream of the downstream most location in the compressor section, with the bleed inlet passage being a downstream end of a compressor diffuser.

In another embodiment according to any of the previous embodiments, the baffle plate associated with the higher pressure location is attached to the compressor diffuser.

In another embodiment according to any of the previous embodiments, the baffle plate at the lower pressure location extends circumferentially and is cylindrical with the holes extending with at least a component in a radially outward direction through the cylindrical section to the bleed exit port.

In another embodiment according to any of the previous embodiments, the baffle plate is at the higher pressure location, with the holes extending with at least a component in an axial direction through the baffle plate to the bleed outlet line.

In another embodiment according to any of the previous embodiments, the baffle plate at the higher pressure location is generally circular, with the holes extending with at least a component in an axial direction through the baffle plate to the bleed exit port.

In another embodiment according to any of the previous embodiments, each of the bleed exit ports are to be connected to a use through a valve having an electric control to select between the two bleed exit ports lines to connect to the use.

In another embodiment according to any of the previous embodiments, the use is a cabin air supply system for the associated aircraft.

In another embodiment according to any of the previous embodiments, the increase in the area of the holes is achieved by increasing the size of the holes.

In another embodiment according to any of the previous embodiments, the increase in the area of the holes is achieved by increasing the quantity of the holes.

In another featured embodiment, an aircraft air supply system includes a gas turbine engine including a compressor section having a downstream most location and more upstream locations. A compressor housing surrounds compressor rotors, a combustor downstream of the compressor and a turbine section downstream of the combustor. At least one bleed inlet passage bleeds air compressed in the compressor section, and delivers the air for use on an associated aircraft. A baffle plate is intermediate the at least one bleed inlet passage and a bleed exit port from the gas turbine engine. The baffle plate has a plurality of holes for allowing the air to flow from the bleed inlet passage to the bleed exit port, with an area of the holes increasing from a location adjacent the at least one bleed exit port and in a circumferential direction away from the at least one bleed exit port. The bleed exit port is to be connected to the use.

In another embodiment according to any of the previous embodiments, there are at least two inlet passages, associated baffle plates and bleed exit ports with one of the bleed inlet passages associated with a higher pressure location and one of the bleed inlet passages associated with a lower pressure location in the compressor section. Each of the bleed exit port is to be connected to the use through a valve having an electric control to select between the two bleed exit ports to connect to the use. The use is a cabin air supply system for the associated aircraft.

In another embodiment according to any of the previous embodiments, the bleed inlet passage associated with the lower pressure location extends through a housing of the compressor section.

In another embodiment according to any of the previous embodiments, the higher pressure location is downstream of the downstream most location in the compressor section, with the bleed inlet passage being a downstream end of a compressor diffuser.

In another embodiment according to any of the previous embodiments, the baffle plate at the lower pressure location extends circumferentially and is cylindrical with the holes extending with at least a component in a radially outward direction through the cylindrical section to the bleed outlet line.

In another embodiment according to any of the previous embodiments, the baffle plate is at the higher pressure location, with the holes extending with at least a component in an axial direction through the baffle plate to the bleed outlet line.

In another embodiment according to any of the previous embodiments, the baffle plate is generally thin and with the holes extending with at least a component in an axial direction through the baffle plate to the bleed exit port.

In another featured embodiment, an aircraft includes an aircraft body including a gas turbine engine including a compressor section having a downstream most location and more upstream locations. A compressor housing surrounds compressor rotors, a combustor downstream of the compressor and a turbine section downstream of the combustor. At least one bleed inlet passage bleeds air compressed in the compressor section, and delivers the air for use on an associated aircraft. A baffle plate is intermediate the at least one bleed inlet passage and a bleed exit port from the gas turbine engine. The baffle plate has a plurality of holes for allowing the air to flow from the bleed inlet passage to the bleed exit port connection, with an area of the holes increasing from a location adjacent the at least one bleed exit port and in a circumferential direction away from the at least one bleed exit port. The bleed exit port is to be connected to the use. There are at least two bleed inlet passages, associated baffle plates and bleed exit ports with one of the bleed inlet passages associated with a higher pressure location and one of the bleed inlet passages associated with a lower pressure location in the compressor section. Each of the bleed exit port is to be connected to the use through a valve having an electric control to select between the two bleed exit port to connect to the use. The use is a cabin air supply system for the associated aircraft.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 4A shows an alternative to the FIG. 3B baffle.

FIG. 4B shows an alternative to the FIG. 3B baffle.

FIG. 5B is a circumferential view of the baffle in the FIG. 5A embodiment.

FIG. 5C is another view of the FIG. 5B baffle.

DETAILED DESCRIPTION

Figure 1:
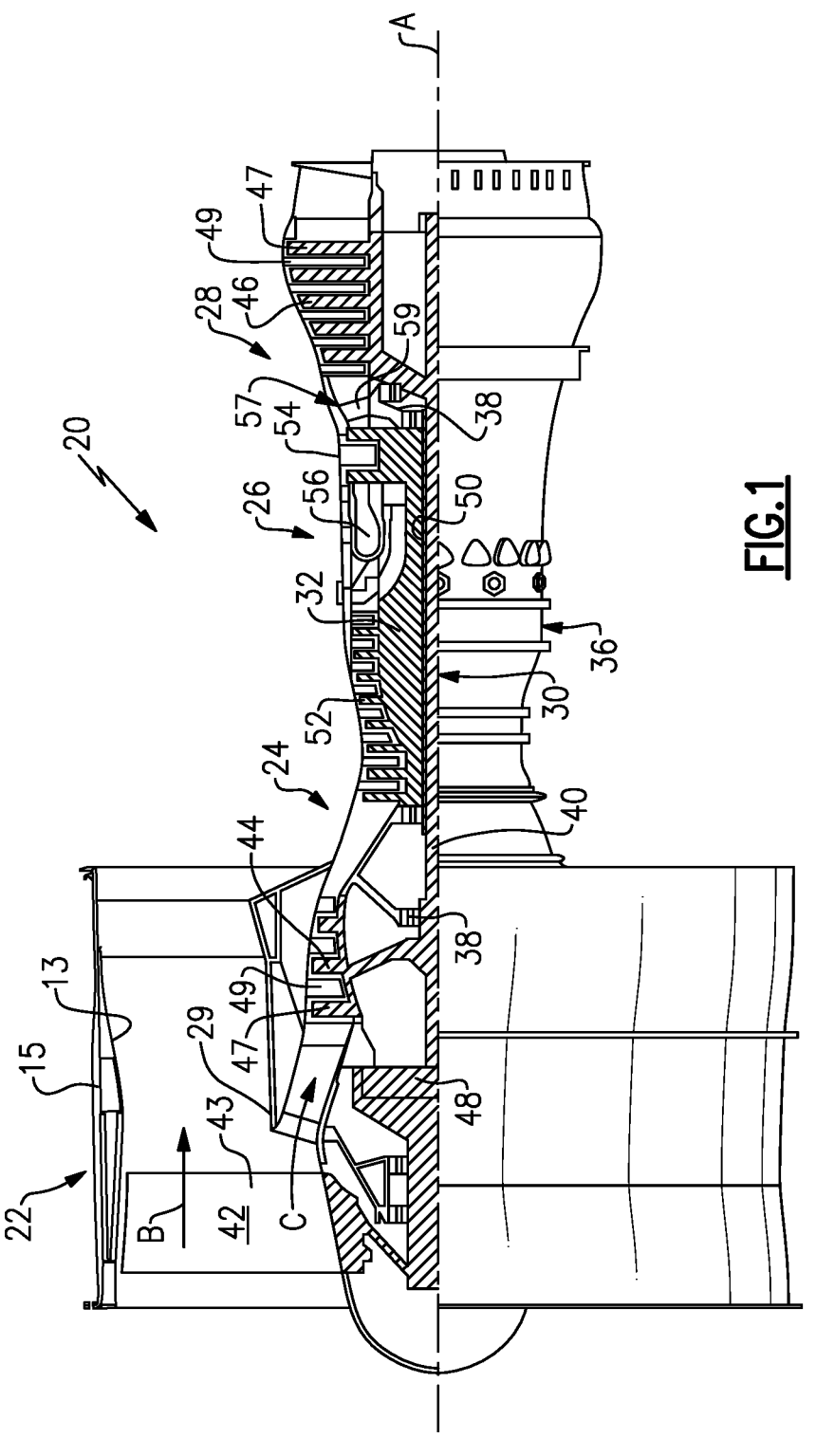
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. The shafts may co-rotate or counter-rotate.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram \ ^\circ R)/(518.7^\circ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F. such as between 900.0° F. and 975.0° F. The relatively low EGT can be utilized in combination with the other techniques disclosed herein to reduce fuel consumption.

Figure 2:
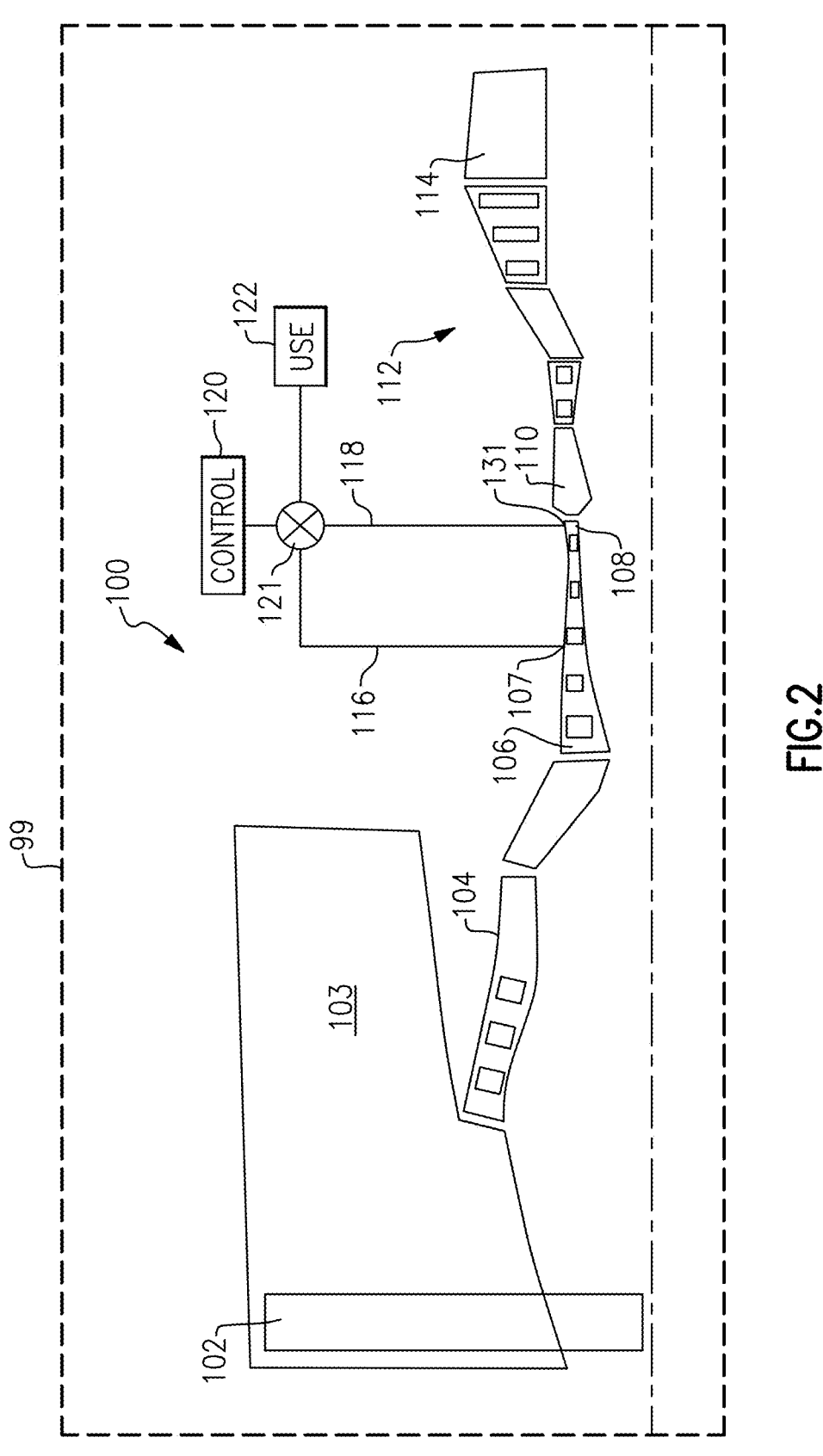
FIG. 2 schematically shows a bleed air system in an aircraft.

FIG. 2 shows an engine bleed system 100 schematically. A fan 102 delivers air into a low pressure compressor 104 and a bypass duct 103. The air passes into a high pressure compressor 106.

The high pressure compressor 106 has a most downstream location 108.

From the compressor section 106 the air moves into a combustor 110 where it is ignited. The air then passes over a turbine section 112 and outwardly of an exhaust nozzle 114.

Figures 3A, 3B, 3C, 6:
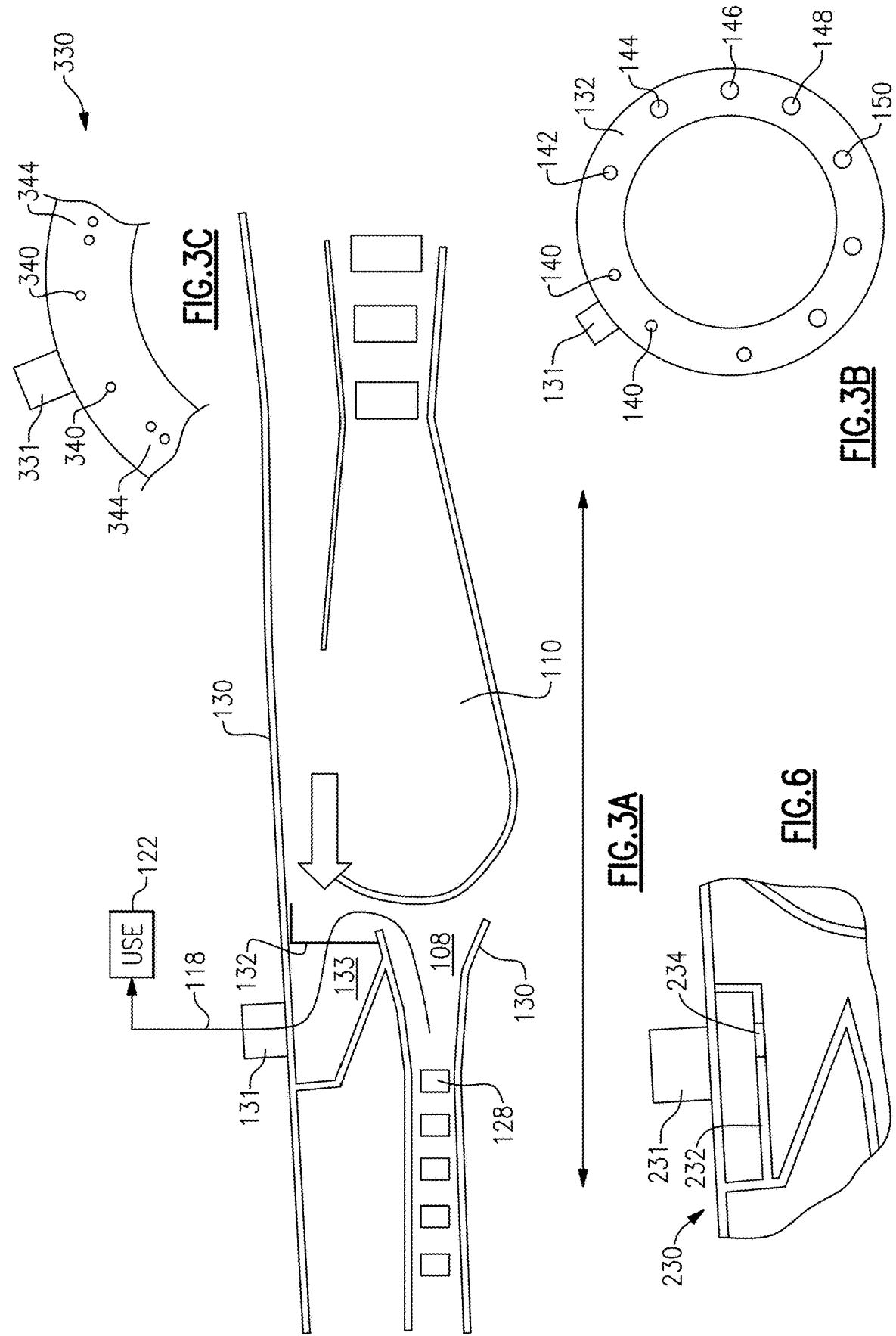
FIG. 3A shows a first bleed location.
FIG. 3B shows a first embodiment of a diffuser baffle.
FIG. 3C shows another embodiment.
FIG. 6 shows another alternative to the FIG. 3B baffle.

A bleed system includes a first bleed line 116 from an upstream tap location bleed exit port 107 in the high pressure compressor 106 that is upstream of the most downstream location 108. A second bleed line 118 is from a higher pressure tap location bleed exit port 131. In the example the higher pressure location is the most downstream location 108, although other locations may be utilized. As illustrated in FIG. 3A the bleed exit port 131 is from the diffuser downstream of the compressor. Further, while the location of the bleed exit port 107 for first bleed line 116 is in the high pressure compressor, it may also be somewhere within the low pressure compressor 104.

A valve 121 is controlled by a control 120 to selectively send air between the two bleed lines 116 and 118 to a use 122. In one embodiment the use 122 could be a cabin air conditioning system for an associated aircraft 99, shown schematically.

While bleed lines 116 and 118 are shown in combination, the teaching of this disclosure could extend to other bleed systems having only a single bleed location and utilized for uses other than cabin air conditioning systems. As another example, the air could be utilized for turbine cooling. Further, bleed systems that do not include a controlled valve, such as systems with a passive valve, or no valve at all could benefit from this disclosure.

FIG. 3A shows detail of the bleed exit port 131. Air from the most downstream location 108 moves into a compressor diffuser 130. That air exits the diffuser and then moves toward the combustor 110. Some of this air passes through a baffle plate 132 to bleed exit port 131 and into line 118. In this sense, the entire compressor diffuser 130 act as a bleed inlet passage. The air moves through a plenum 133 between the baffle plate 132 and the bleed exit port 131. In at least one example, the baffle plate 132 may be coupled or attached to the compressor diffuser 130, such as via one or more couplings.

FIG. 3B shows the baffle plate 132. In the illustrative example, the baffle plate 132 includes apertures or holes 140 that extend through the baffle plate 132. Moving circumferentially away from the location of the bleed exit port 131 the apertures 144/146/148/150 get progressively larger. This type of pattern encourages flow circumferentially all around the circumference of the baffle 132 such that the air passing downstream of the baffle plate 132 tends to be dispersed and evenly distributed. An ideal state can be reached when the sum of baffle loss and circumferential manifold loss equals a constant. Circumferentially similar baffle flow results in the pressure of the flow entering combustor 110 to also be close to uniform circumferentially, a condition beneficial for good combustion and more uniform downstream flow. Without baffle plate 132 the air reaching bleed exit port 131 would be more local to the outlet and this would reduce the efficient provision of air to combustor 110.

The baffle plate at the higher pressure location is generally circular, with the holes extending in an axial direction through the baffle plate to the bleed exit port 131 and line 118.

Note non-uniformly spaced output ports can be similarly optimized by again making the sum of baffle loss and circumferential manifold baffle loss equal around the circumference. In such a baffle the cross-sectional area of the holes at each successive location would increase moving away from the outlets. Thus, as shown in FIG. 3C, in an embodiment 330 the bleed exit port 331 has single holes 340 circumferentially adjacent bleed exit port 331, and plural holes 344 circumferentially spaced from bleed exit port 331. This increases the flow area at locations spaced circumferentially from the exit port 331. As with all of these embodiments, it should be understood that for simplicity of illustration only a few holes are illustrated, but in practice, there may be many more holes. It should also be noted that larger holes with the same total area can be used instead of multiple holes at any particular location.

Figure 3D:
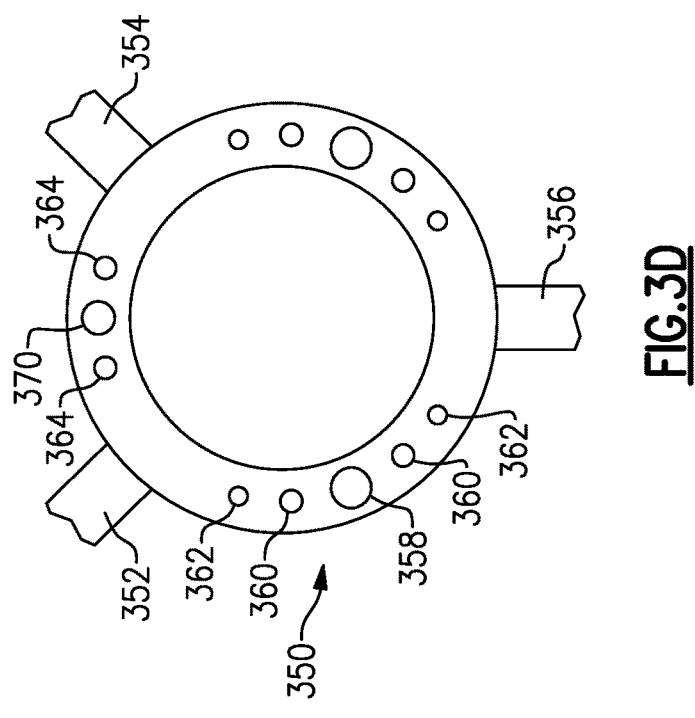
FIG. 3D shows another embodiment.

FIG. 3D shows an embodiment wherein the bleed exit ports 352 and 354 are relatively close circumferentially, and bleed exit port 356 is further spaced circumferentially. That is, there are unequal distances between the three exit ports 352, 354, 356. Thus, there are relatively large holes 358 in the greater distance between the exit ports 352/354 and exit port 356. The area of the holes 360 and 362 get smaller as one moves toward the exit ports. Conversely, between the closer spaced exit ports 352 and 354 the holes 364 and 370 are not as large as hole 358

FIG. 4A shows an alternative to the baffle plate illustrated FIG. 3B, baffle plate 200. In embodiment 200, there are two bleed exit ports 231 which are circumferentially spaced by 180 degrees. The holes through the baffle plate 200 increase in cross-sectional area from a location 202 adjacent the bleed exit ports 231, towards locations 204 spaced circumferentially away from (e.g., distal to) the bleed exit ports 231.

FIG. 4B shows another embodiment system 250 wherein there are four bleed exit ports 252 circumferentially spaced. The system 250 is shown with a baffle plate 254 having smaller holes 256 circumferentially closer to the bleed exit ports 252 and larger holes 258 spaced circumferentially from the bleed exit ports 252. While only two such ports are illustrated it should be understood that a much larger number would likely be utilized.

While the holes are shown as circular, holes having other cross-sections would come within the scope of this disclosure. The holes would still appropriately vary in cross-sectional area distal to the bleed exit ports.

Figure 5A:
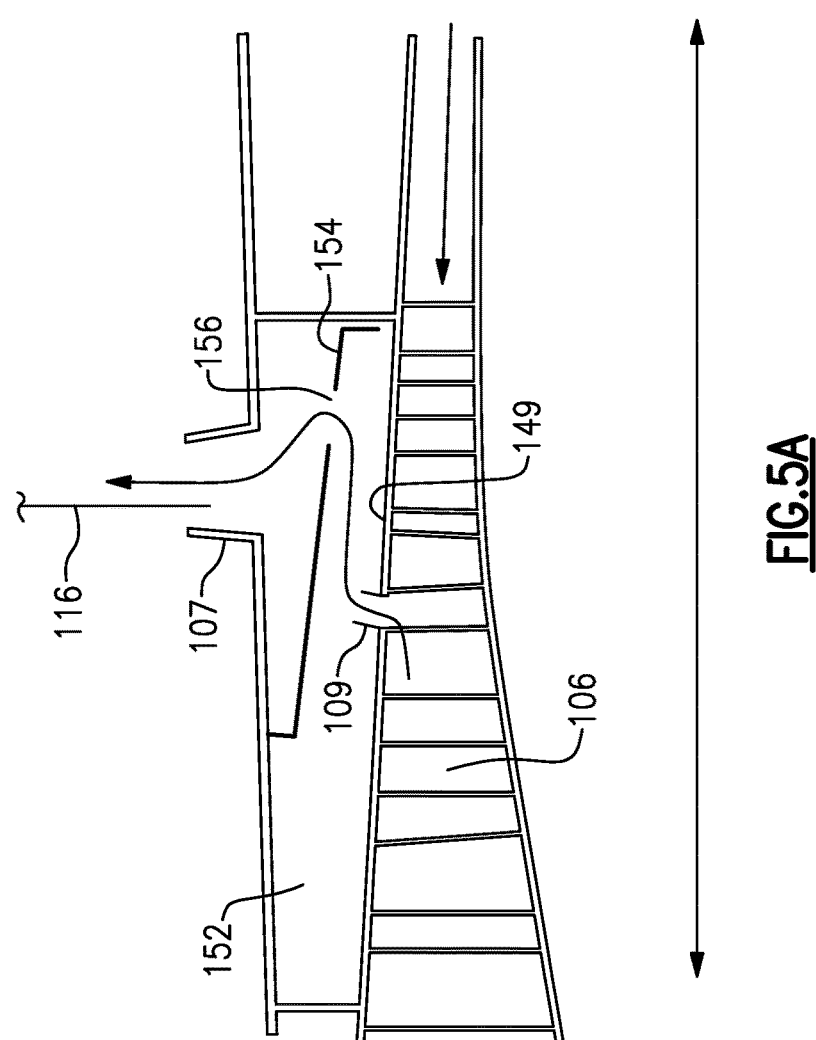
FIG. 5A shows another bleed location.

FIG. 5A shows a low pressure bleed system wherein an outer compressor housing 149 surrounds the high pressure compressor 106. A bleed inlet passage 109 extends into a chamber 152 radially outwardly of the housing 149. In practice there are plural bleed inlet passages 109. The air then encounters a baffle 154 having holes 156 before moving into the bleed.

As shown in FIG. 5B the baffle 154 has holes 160 circumferentially associated with the location of the bleed exit port 107 and increasing in cross-sectional area between holes 162 and 166. In the embodiment shown in FIG. 5B there is a second bleed exit port 151 such that the holes 160, 162, 166 are on each circumferential side of the baffle plate 154. However, similar to the FIG. 3B embodiment there may be a single bleed exit port with the FIG. 5A embodiment.

FIG. 5C shows the cross-sectional areas of holes 160 and 162 increasing in a circumferential direction moving away from bleed exit port 107. Only a small portion of the baffle plate 154 is illustrated here and in practice there would be more than two sized holes.

The plate at the lower pressure location extends circumferentially and is cylindrical with the holes extending radially outwardly through the cylindrical section to a bleed outlet line, such as bleed lines 116, 118, or the like.

Another embodiment baffle plate 230 is shown in FIG. 6 generally in the location of the FIG. 3A baffle plate. Here the baffle plate 232 extends to have radial holes 234 through which the air will move to reach the bleed exit port 231. It should be understood that the size of these holes will vary as shown with regard to the FIG. 5A/5C embodiment.

Any of the above embodiments can be utilized with plural bleed taps, plural outlets, radially or axially extending holes. In fact, the baffle plate may be formed as shown in FIG. 5A to extend with an angle such that the hole has both an axial and a radial component. Also, the variation can be achieved by changing hole size or the number of holes, or both.

A gas turbine engine under this disclosure could be said to include a compressor section having a downstream most location and more upstream locations. A compressor housing surrounds the compressor rotors. A combustor is downstream of the compressor and a turbine section is downstream of the combustor. At least one bleed inlet passage bleeds air compressed air from the compressor section, and delivers the air for use on an associated aircraft. A baffle plate is situated intermediate the at least one bleed inlet passage and a bleed exit port from the gas turbine engine. The baffle plate has a plurality of holes for allowing the air to flow from the bleed inlet passage to the bleed exit port, with an area of the holes increasing from a location adjacent the at least one bleed inlet passage and in a circumferential direction away from the at least one bleed inlet passage.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A gas turbine engine comprising:
   a compressor section having a downstream most location and more upstream locations and a compressor housing surrounding compressor section rotors, a combustor downstream of said compressor and a turbine section downstream of said combustor;
   at least one bleed inlet passage for bleeding air compressed from the compressor section, and delivering the air for use on an associated aircraft; and
   a baffle plate intermediate the at least one bleed inlet passage and at least one bleed exit port from the gas turbine engine, the baffle plate having a plurality of holes for allowing the air to flow from the at least one bleed inlet passage to the at least one bleed exit port, with an area of the plurality of holes increasing from a location adjacent the at least one bleed exit port and in a circumferential direction away from the at least one bleed exit port.

2. The gas turbine engine as set forth in claim 1, wherein there are at least two bleed inlet passages, associated baffle plates and at least two bleed exit ports with one of said at least two bleed inlet passages associated with a higher pressure location and one of the at least two bleed inlet passages associated with a lower pressure location in the compressor section.

3. The gas turbine engine as set forth in claim 2, wherein said one of the at least two bleed inlet passages associated with said lower pressure location extends through a housing of the compressor section.

4. The gas turbine engine as set forth in claim 2, wherein the higher pressure location is downstream of the downstream most location in the compressor section, with the one of said at least two bleed inlet passages associated with the higher pressure location being a downstream end of a compressor diffuser.

5. The gas turbine engine as set forth in claim 2, wherein the baffle plate associated with the higher pressure location is attached to the compressor diffuser.

6. The gas turbine engine as set forth in claim 2, wherein said baffle plate at the lower pressure location extending circumferentially and being cylindrical with said plurality of holes extending with at least a component in a radially outward direction through a cylindrical section to the at least two bleed exit ports.

7. The gas turbine engine as set forth in claim 6, wherein the baffle plate at the higher pressure location, with said plurality of holes extending with at least a component in an axial direction through said baffle plate to the at least two bleed exit ports.

8. The gas turbine engine as set forth in claim 2, wherein the baffle plate at the higher pressure location being generally circular, with said plurality of holes extending with at least a component in an axial direction through said baffle plate to the at least two bleed exit ports.

9. The gas turbine engine as set forth in claim 2, each of said at least two bleed exit ports are to be connected to a use through a valve having an electric control to select between the at least two bleed exit ports to connect to the use.

10. The gas turbine engine as set forth in claim 9, wherein the use is a cabin air supply system for the associated aircraft.

11. The gas turbine engine as set forth in claim 1, wherein the increase in the area of the plurality of holes is achieved by increasing the size of the plurality of holes.

12. The gas turbine engine as set forth in claim 1, wherein the increase in the area of the plurality of holes is achieved by increasing the quantity of the plurality of holes.

13. An aircraft air supply system comprising:

a gas turbine engine including a compressor section having a downstream most location and more upstream locations and a compressor housing surrounding compressor rotors, a combustor downstream of said compressor section and a turbine section downstream of said combustor;

at least one bleed inlet passage for bleeding air compressed in the compressor section, and delivering the air for use on an associated aircraft;

a baffle plate intermediate the at least one bleed inlet passage and at least one bleed exit port from the gas turbine engine, the baffle plate having a plurality of holes for allowing the air to flow from the at least one bleed inlet passage to the at least one bleed exit port, with an area of the plurality of holes increasing from a location adjacent the at least one bleed exit port and in a circumferential direction away from the at least one bleed exit port; and said at least one bleed exit port to be connected to the use on the associated aircraft.

14. The system as set forth in claim 13, wherein there are at least two inlet passages, associated baffle plates and bleed exit ports with one of said at least two bleed inlet passages associated with a higher pressure location and one of the at least two bleed inlet passages associated with a lower pressure location in the compressor section, each of said at least two bleed exit ports to be connected to the use through a valve having an electric control to select between the at least two bleed exit ports to connect to the use, and the use is a cabin air supply system for the associated aircraft.

15. The system as set forth in claim 14, wherein said one of the at least two bleed inlet passages associated with said lower pressure location extends through a housing of the compressor section.

16. The system as set forth in claim 14, wherein the higher pressure location is downstream of the downstream most location in the compressor section, with the one of said at least two bleed inlet passages associated with the higher pressure location being a downstream end of a compressor diffuser.

17. The system as set forth in claim 14, wherein said baffle plate at the lower pressure location extending circumferentially and being cylindrical with said plurality of holes extending with at least a component in a radially outward direction through a cylindrical section to the at least two bleed exit ports.

18. The system as set forth in claim 17, wherein the baffle plate at the higher pressure location, with said plurality of holes extending with at least a component in an axial direction through said baffle plate to the at least two bleed exit ports.

19. The system as set forth in claim 14, wherein said plurality of holes extending with at least a component in an axial direction through said baffle plate to the at least two bleed exit ports.

20. An aircraft comprising:

an aircraft body including a gas turbine engine including a compressor section having a downstream most location and more upstream locations and a compressor housing surrounding compressor section rotors, a combustor downstream of said compressor and a turbine section downstream of said combustor;

at least one bleed inlet passage for bleeding air compressed in the compressor section, and delivering the air for use on an associated aircraft;

a baffle plate intermediate the at least one bleed inlet passage and at least one bleed exit port from the gas turbine engine, the baffle plate having a plurality of holes for allowing the air to flow from the at least one bleed inlet passage to the at least one bleed exit port, with an area of the plurality of holes increasing from a location adjacent the at least one bleed exit port and in a circumferential direction away from the at least one bleed exit port;

said at least one bleed exit port to be connected to the use; and wherein there are at least two bleed inlet passages, associated baffle plates and bleed exit ports with one of said at least two bleed inlet passages associated with a higher pressure location and one of the at least two bleed inlet passages associated with a lower pressure location in the compressor section, each of said at least two bleed exit ports to be connected to the use through a valve having an electric control to select between the at least two bleed exit ports to connect to the use, and the use is a cabin air supply system for the associated aircraft.

* * * * *